US012584201B2

(12) United States Patent
Kissling et al.

(10) Patent No.: US 12,584,201 B2
(45) Date of Patent: Mar. 24, 2026

(54) ITEM MADE OF PRECIOUS CERMET

(71) Applicant: The Swatch Group Research and Development Ltd, Marin (CH)

(72) Inventors: Gregory Kissling, La Neuveville (CH); Denis Vincent, Neuchâtel (CH); Stéphane Lauper, Cortaillod (CH); Bernard Bertheville, Sion (CH)

(73) Assignee: The Swatch Group Research and Development Ltd, Marin (CH)

( * ) Notice: Subject to any disclaimer, the term of this patent is extended or adjusted under 35 U.S.C. 154(b) by 941 days.

(21) Appl. No.: 17/805,886

(22) Filed: Jun. 8, 2022

(65) Prior Publication Data

US 2023/0114281 A1 Apr. 13, 2023

(30) Foreign Application Priority Data

Oct. 12, 2021 (EP) .................................... 21202053

(51) Int. Cl.
| | |
|---|---|
| *C22C 29/08* | (2006.01) |
| *C22C 29/00* | (2006.01) |
| *B33Y 70/00* | (2020.01) |

(52) U.S. Cl.
CPC ............ *C22C 29/08* (2013.01); *C22C 29/005* (2013.01); *B33Y 70/00* (2014.12)

(58) Field of Classification Search
CPC ........ C22C 29/08; C22C 29/005; G04B 37/22
See application file for complete search history.

(56) References Cited

U.S. PATENT DOCUMENTS

| | | |
|---|---|---|
| 6,514,456 B1 | 2/2003 | Lackner et al. |
| 2012/0304694 A1 | 12/2012 | Derrig |
| 2017/0119114 A1 | 5/2017 | Derrig |
| 2019/0136352 A1* | 5/2019 | Bertheville ............. C22C 38/02 |

FOREIGN PATENT DOCUMENTS

| | | |
|---|---|---|
| CN | 109072361 A | 12/2018 |
| CN | 113165983 A | 7/2021 |
| WO | WO 2016/115581 A1 | 7/2016 |

OTHER PUBLICATIONS

Combined Chinese Office Action and Search Report issued Jan. 11, 2024, in corresponding Chinese Patent Application No. 202210942440.3 (with English Translation and English Translation of Category of Cited Documents), 10 pages.
European Search Report issued Mar. 24, 2022 in European Application 21202053.1 filed on Oct. 12, 2021 (with English Translation of Categories of cited documents), 3 pages.

* cited by examiner

*Primary Examiner* — Amber R Orlando
(74) *Attorney, Agent, or Firm* — Oblon, McClelland, Maier & Neustadt, L.L.P.

(57) ABSTRACT

An item produced in a cermet material including by weight between 85 and 94% of a ceramic phase and between 6 and 15% of a metal binder phase, the ceramic phase mostly including a tungsten carbide phase and optionally one or more phases of one or more secondary carbides selected from the elements Ti, Zr, Hf, V, Nb, Ta, Cr and Mo, the metal binder comprising Ag, Pd, Ru and Co. The invention generally relates to the method for manufacturing said item.

14 Claims, 1 Drawing Sheet

ITEM MADE OF PRECIOUS CERMET

CROSS-REFERENCE TO RELATED APPLICATION

This application claims priority to European Patent Application No. 21202053.1 filed on Oct. 12, 2021, the entire disclosure of which is hereby incorporated herein by reference.

TECHNICAL FIELD

The present invention relates to an item, particularly to a decorative item, and more specifically to a timepiece component, produced in a non-magnetic cermet-type material. This item includes a ceramic phase with mostly tungsten carbides and a metal binder including a plurality of precious elements.

PRIOR ART

Cermets generally contain a metal binder such as nickel or cobalt that have the drawback of having a significant residual ferromagnetism for applications in the field of horology. It is becoming increasingly necessary to limit or completely eliminate this ferromagnetism in order to guarantee an operation that is as accurate as possible for watches, particularly mechanical. It is therefore imperative to develop new cermets eliminating any use of ferromagnetic or diamagnetic binders.

Furthermore, the cermets used for specific applications such as bezels or more generally watch cases must have a very good scratch resistance, that is to say a hardness greater than 1,000 Vickers. This then requires reducing the amount of metal binder while controlling the wettability between said metal binder and the ceramic phase, a poor wettability resulting in a reduction of the density on the final product and thereby of the hardness.

Apart from the absence of ferromagnetism or of diamagnetism and the high hardnesses required, the tenacity is an important property in the field of horology. Aestheticism is added to this which is crucial for external part watch components. In particular, the metallic lustre of the component is an aesthetic aspect on which special attention is paid.

SUMMARY OF THE INVENTION

The object of the present invention is to overcome the aforementioned drawbacks by proposing an item produced in a cermet-type material, with a composition and a manufacturing method optimised for meeting the following criteria:

eliminate any ferromagnetism or diamagnetism, have a low magnetic susceptibility $\chi_m$ low, less than $5 \times 10^{-5}$, have a high metallic lustre i.e. a minimum luminance index L* of 65 and more preferably minimum of 70 for timepiece external part applications, be able particularly to be densified by liquid phase sintering, under atmospheric pressure, under vacuum or under partial gas pressure, have a minimum Vickers hardness of 500, preferably minimum of 700 and more preferably minimum of 1,000 HV30 for an application requiring a very good scratch resistance, while having a sufficient tenacity with, preferably, a Kic greater than or equal to 4 MPa·m½, For this purpose, the present invention proposes an item produced in a cermet material including by weight between 85 and 94% of a ceramic phase mostly including tungsten carbides and between 6 and 15% of a metal binder phase comprising a plurality of metals of which precious metals.

More precisely, said cermet material comprises the element cobalt between 0.02 and 4% by weight, the element ruthenium between 0.02 and 4% by weight, the element palladium between 0.5 and 4% by weight and the element silver between 5 and 14% by weight. In other words, said cermet material consists, apart from the impurities, of the element cobalt between 0.02 and 4% by weight, of the element ruthenium between 0.02 and 4% by weight, of the element palladium between 0.5 and 4% by weight and of the element silver between 5 and 14% by weight.

Preferably, said cermet material consists, apart from the impurities, of the element cobalt between 0.02 and 3% by weight, of the element ruthenium between 0.02 and 3% by weight, of the element palladium between 0.5 and 3% by weight and of the element silver between 7 and 13.4% by weight.

Even more preferably, said cermet material consists, apart from the impurities, of the element cobalt between 0.03 and 2% by weight, of the element ruthenium between 0.03 and 2% by weight, of the element palladium between 0.5 and 2% by weight and of the element silver between 7 and 10% by weight.

Silver is mostly used in the binder given its low cost and its miscibility with the elements cobalt, ruthenium and palladium. Palladium is mainly added to prevent an air stain or oxidation of silver while having as another advantage of not having ferromagnetism. It also makes it possible to increase the corrosion resistance.

The elements cobalt and ruthenium are incorporated in low amounts in order to in addition improve the densification during sintering given that they are both miscible in silver while improving the wettability with the tungsten carbide grains. They therefore advantageously make it possible to improve the densification.

The cermet material thus developed does not have a ferromagnetic or diamagnetic component, and has after polishing a metallic lustre comparable to that observed in stainless steels. These precious cermets have another advantage of being devoid of nickel that is known as being a highly allergenic element. They also have high hardnesses and sufficient tenacities for the production of external part components and functional parts. Furthermore, they may be created by conventional methods for manufacturing solid materials such as by casting, or by powder metallurgy in order to obtain three-dimensional parts shaped by pressing or by injection or by extrusion or by various other additive manufacturing methods such as for example 3D printing.

Parts therefore of more or less complex shape may finally be consolidated at temperatures between 1,100 and 1,500° C., under atmospheric pressure, under vacuum or under partial gas pressure, that is to say without using significant pressures.

Other features and advantages of the present invention will become apparent in the following description of a preferred embodiment, presented by way of non-limiting example with reference to the appended drawings.

3 and of 10% of a precious binder consisting of 89% of Ag, of 10% of Pd, of 0.5% of Ru and of 0.5% of Co, i.e. in relation to the total weight 8.9% of Ag, 1% of Pd, 0.05% of Ru and 0.05% of Co.

Figure 2:
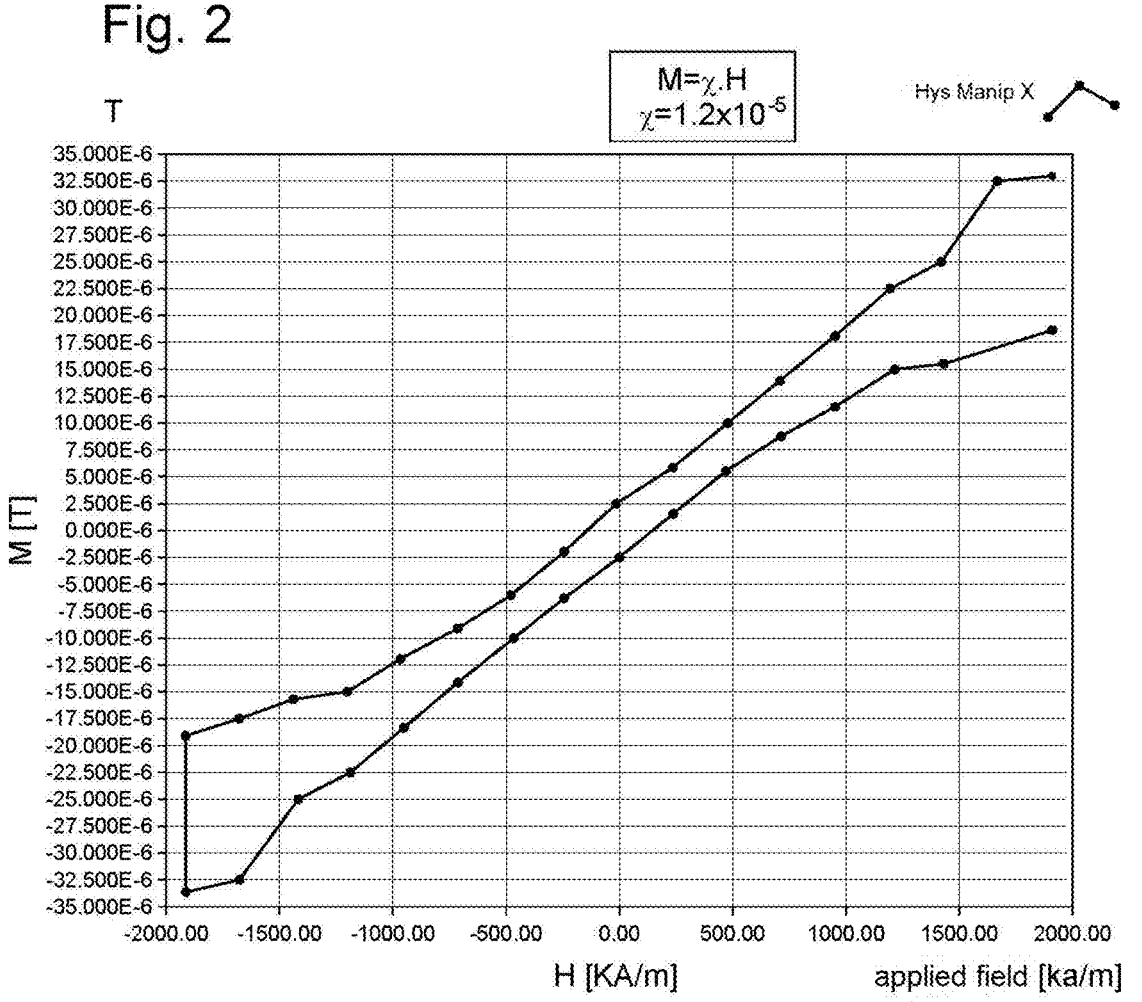

FIG. 2 shows the paramagnetic behaviour of this same cermet-type material having a magnetic susceptibility $\chi_m$ of $1.2 \times 10^{-5}$.

DETAILED DESCRIPTION

The present invention relates to an item produced in a cermet-type material including a ceramic phase consisting of carbides and of a binder phase consisting of a plurality of metals of which precious metals. The cermet includes by weight between 85 and 94% of the ceramic phase and between 6 and 15% of the metal binder phase. Preferably, the cermet includes by weight between 86 and 93% of the ceramic phase and between 7 and 14% of the precious metal binder phase. Preferably, the cermet includes by weight between 87 and 92% of the ceramic phase and between 8 and 13% of the precious metal binder phase. Even more preferably, the cermet includes by weight between 89 and 91% of the ceramic phase and between 9 and 11% of the precious metal binder phase.

The metal binder comprises silver, palladium, ruthenium and cobalt. Preferably, the metal binder consists, apart from the impurities, of silver, of palladium, of ruthenium and of cobalt. In relation to the total weight, cobalt and ruthenium are each present in a percentage between 0.02 and 4% by weight. Preferably, cobalt and ruthenium are each present in a percentage between 0.02 and 3%, more preferably between 0.03 and 2% by weight, even more preferably between 0.03 and 1%, even more preferably between 0.03 and 0.5% and in a particularly preferred manner between 0.03 and 0.4%. In relation to the total weight, palladium is between 0.5 and 4% and silver between 5 and 14%. Preferably, palladium is between 0.5 and 3%, more preferably, palladium is between 0.5 and 2%, and even more preferably between 0.5 and 1.5%. Preferably, silver is between 7 and 13.4% and more preferably between 7 and 10% by weight.

The ceramic phase comprises a phase mostly of tungsten carbide and optionally one or more carbide phases of one or more elements selected from Ti, Zr, Hf, V, Nb, Ta, Cr and Mo. In other words, the ceramic phase consists either of a single tungsten carbide phase, or of a phase mostly of tungsten carbide added with one or more phases respectively of one or more carbides of Ti, Zr, Hf, V, Nb, Ta, Cr and Mo, this or these phases of carbides of Ti, Zr, Hf, V, Nb, Ta, Cr and Mo being present in a minor proportion. Mostly means a percentage greater than 50% by weight, preferably greater than or equal to 65%, more preferably greater than or equal to 75%. In short, within the ceramic phase, the tungsten carbide phase is present in a percentage by weight greater than 50% and less than or equal to 100% (50<WC≤100%), preferably greater than or equal to 65% and less than or equal to 100% (65≤WC≤100%), more preferably greater than or equal to 75% and less than or equal to 100% (75≤WC≤100%) with the complement formed of one or other carbides of Ti, Zr, Hf, V, Nb, Ta, Cr and Mo.

According to the invention, this cermet-type material is non-magnetic. For the remainder of this description, the mention of "non-magnetic" for this cermet-type material refers to a material that is only paramagnetic and having a very low magnetic susceptibility. It is well known that in a phase diagram, the Curie temperature indicates the transition temperature from a ferromagnetic state to a paramagnetic state, at a given temperature and for a fixed composition. Thus, for the Cobalt-Ruthenium phase diagram, this magnetic transition occurs at the ambient temperature for a Ruthenium mass concentration located between 45% and 50%. In the same way, it is possible to determine in the Cobalt-Palladium phase diagram a paramagnetic transition located between 4% and 6% by weight of cobalt, at the same ambient temperature. By respecting the two limits mentioned above, it is then possible to have a paramagnetic transition in the Palladium-Cobalt-Ruthenium ternary system. The cermet-type material with precious binder consists of the elements palladium, cobalt, ruthenium according to the limits of the compositions defined and silver is therefore paramagnetic.

The item may be a constituent element of watches, jewellery, bracelets, etc. In the field of horology, this item may be an external part such as a middle, a back, a bezel, a push-piece, a bracelet link, a dial, a hand, a dial index, etc. It may also concern a component of the movement selected from the non-exhaustive list comprising a toothed wheel, an arbour, a pinion, a spring, a bridge, a plate, a screw and a balance. Advantageously, within components of the movement, this concerns a balance arbour.

The cermet item may be shaped by conventional powder metallurgy methods such as pressing or injection or extrusion or by various additive manufacturing methods dedicated to the manufacture of three-dimensional parts such as selective laser melting (SLM), selective electron beam melting (SEBM), such as 3D printing (3DP), binder jet 3D printing (BJAD), 3D gel printing (3DGP) and fused filament fabrication (FFF).

The cermet item is preferably produced by sintering starting from a mixture of ceramic and metal powders. The manufacturing method includes the following steps of:

a) Producing a mixture with the various powders and this possibly in a wet environment. The starting powders have preferably a d50 less than 10 μm, and more preferably between 0.8 and 5 μm. The mixture may possibly be produced in a mill, which reduces the d50 of the particles of the powder to a size in the order of the micron, or even less than the micron after milling. This mixture includes by weight between 85 and 94%, preferably between 86 and 93%, more preferably between 89 and 91%, of the ceramic powder and between 6 and 15%, preferably between 7 and 14%, more preferably between 9 and 11% of the metal powder. The ceramic powder includes tungsten carbide and optionally one or more other carbides. The metal powder only consists of the elements silver, palladium, ruthenium and cobalt. The cermet thus produced therefore includes by total weight 5 to 14% of silver, preferably between 7 and 13.4% of silver, more preferably between 7 and 10% of silver. It also includes by total weight 0.5 to 4% of palladium, preferably between 0.5 and 3% of palladium, more preferably between 0.5 and 2% of palladium, and even more preferably between 0.5 and 1.5% of palladium. This cermet also includes ruthenium and cobalt with a content by weight for each between 0.02 to 4%, preferably between 0.02 and 3%, more preferably between 0.03 and 2%, and even more preferably between 0.03 and 1%, between 0.03 and 0.5% and between 0.03 and 0.4%. It will be specified for this step that the metal phase may also be manufactured by arc melting then be sprayed in the form of pre-alloyed powders to finally be mixed with the carbide powders.

b) Possibly, a second mixture comprising the aforementioned mixture and an organic binder system (paraffin, polyethylene, etc.) may be produced.

c) Forming an ébauche by giving to the mixture the shape of the desired item, for example, by injection, by pressing, by extrusion or by 3D printing.

d) Sintering the ébauche under inert atmosphere or under nitrogen or under vacuum at a temperature between 950° C. and 1,600° C., preferably between 1,000° C. and 1,500° C., and more preferably between 1,100 and 1,500° C., during a period between 15 minutes and 8 hours, preferably between 30 minutes and 4 hours, and more preferably between 30 minutes and 2 hours. This step may be preceded by a step of debinding in a range of temperatures between 200 and 800° C. if the mixture includes an organic binder system.

The ébauche thus obtained is cooled and polished. It may also be machined before polishing to obtain the desired item.

The item from the manufacturing method includes the ceramic phase and the metal phase in percentages by weight close to those of the starting powders. However, small variations of compositions and of percentages between the base powders and the materials from the sintering cannot be excluded, depending particularly on the various vapour pressures of the constituent elements of the metal binder with the temperature.

The item has a CIELAB colour space (in accordance with the standards CIE no. 15, ISO 7724/1, DIN 5033 Teil 7, ASTM E-1164) with a luminance L* component, representative of the manner in which the material reflects the light, of minimum 60, preferably of minimum 65 and more preferably of minimum 70.

The cermet material has a Vickers hardness measured under a load of 30 kg (HV30) between 500 and 1,600, preferably between 700 and 1,400, depending on the types and on the percentages of the constituents. Advantageously, it has a hardness greater than 1,000 Vickers for the external parts requiring a high scratch resistance. It has a tenacity Kc of minimum 3 MPa·m$^{1/2}$, preferably of minimum 4.0 MPa·m$^{1/2}$, the tenacity being determined based on measure-cermet according to the invention is less than 5×10$^{-5}$, preferably less than or equal to 4×10$^{-5}$.

Table 1 below repeats a plurality of examples of cermet-type materials with a comparative example without cobalt (sample 01) and two examples according to the invention (samples 02 and 03). In the examples, the ceramic phase is a tungsten carbide phase with a percentage by weight of 90%. The metal binder is therefore present in a percentage by weight of 10% with the compositions given in the table.

The samples have all been manufactured by powder metallurgy. The mixtures of powders of distinct compositions have been prepared in a mill in the presence of a solvent. The mixtures have been produced without adding organic binders. After drying, they have been shaped by uniaxial pressure and sintered under argon and at the same temperature. After sintering, the samples have been flat polished in order to accurately measure the mechanical properties and the colour indices.

Figure 1:
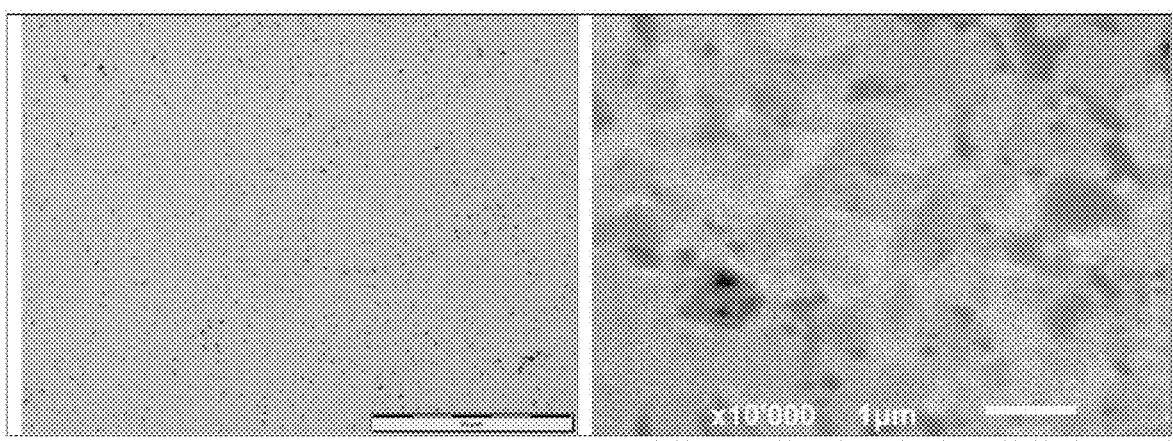
FIG. 1 shows two images respectively in optical and electron microscopy of the cermet-type material according to the invention with a composition by weight of 90% of WC

For the sample 01, a low hardness value less than 350 HV30 is obtained. It is attributed to the significant presence of porosity in the sample in the absence of cobalt. The addition of cobalt in the sample 02 makes it possible to improve the densification during the sintering and thereby to drastically increase the hardness with a value greater than or equal to 800 HV30. The reduction of cobalt and ruthenium contents in the sample 03 makes it possible to reduce the magnetic susceptibility value per unit of volume to a value of 1.2×10$^{-5}$ with the hysteresis curve visible in FIG. 2. This makes it a cermet of choice for a timepiece component of the movement such as a balance arbour. The sample 03 is moreover well densified with very few porosities having sizes of approximately 1 micron as shown in the photos taken during optical microscopy and during electron microscopy of FIG. 1 with on the optical microscopy the black spots that are porosities. This results in an increase of the hardness with a value reaching 1,208 HV30. All of the samples according to the invention fall within the criteria set for a timepiece component having no ferromagnetic properties and no diamagnetic properties, with a tenacity greater than 4.0 MPa·m$^{1/2}$, with a hardness greater than 700 HV30 and having a high metallic lustre with an L* value greater than

TABLE 1

|  |  | Ag (% wt) | Wt (% wt) | Ru (% wt) | Co (% wt) | $\chi_m$ (unit/Vol.) | type | Hardness (HV30) | K1c (Mpa · m$^{1/2}$) | L* |
|---|---|---|---|---|---|---|---|---|---|---|
| 01 | Comp | 87.1 | 10.0 | 2.9 | — | 4.0 × 10$^{-5}$ | Para | 309 | 4.8 | 68.6 |
| 02 | Inv | 85.0 | 10.0 | 2.5 | 2.5 | 3.4 × 10$^{-5}$ | Para | 830 | 5.4 | 72.6 |
| 03 | Inv | 89.0 | 10.0 | 0.5 | 0.5 | 1.2 × 10$^{-5}$ | Para | 1208 | 4.8 | 74.5 | ments of the lengths of cracks at the four ends of the diagonals of the hardness indentation according to the formula:

$$K_{1C} = 0.0319 \frac{P}{al^{1/2}}$$

with P that is the applied load (N), a that is the semi-diagonal (m) and/that is the length of the measured crack (m).

For the magnetic properties, the M(H) hysteresis curve has been characterised at ambient temperature and by varying the applied field on the samples with a vibrating sample magnetometer (VSM) of the MicroSense EZ9 type. The magnetic susceptibility ($\chi m$) per unit of volume of the

The invention claimed is:

1. An item produced in a cermet material, the cermet material comprising:
   between 85 and 94% by weight of a ceramic phase; and
   between 6 and 15% by weight of a metal binder phase, each relative to a total weight of the cermet material,
   wherein the ceramic phase mostly comprises a tungsten carbide phase and optionally one or more phases of one or more carbides selected from the group consisting of elements Ti, Zr, Hf, V, Nb, Ta, Cr, and Mo,
   the metal binder phase consists, apart from the impurities, of Ag, Pd, Ru, and Co,
   Ag is present in a percentage by weight between 5 and 14%,
   Pd is present in a percentage by weight between 0.5 and 4%, and Co and Ru are each independently present in a percentage by weight between 0.02 and 4%, each relative to a total weight of the cermet material.

2. The item according to claim 1, wherein the metal binder phase is present in a percentage by weight between 7 and 14%, and wherein the ceramic phase is present in a percentage by weight between 86 and 93%, each relative to a total weight of the cermet material.

3. The item according to claim 1, wherein the metal binder phase is present in a percentage by weight between 9 and 11%, and wherein the ceramic phase is present in a percentage by weight between 89 and 91%, each relative to a total weight of the cermet material.

4. The item according to claim 1, wherein the tungsten carbide phase only includes tungsten carbide.

5. The item according to claim 1, wherein the cermet material has a Vickers hardness, HV30, between 500 and 1,600.

6. The item according to claim 1, wherein the cermet material has a tenacity KiC greater than or equal to 3.0 MPa·m$^{1/2}$.

7. The item according to claim 1, wherein the cermet material has, in a CIELAB color space, an L* component of at least 60.

8. The item according to claim 1, wherein the cermet material is non-magnetic with a magnetic susceptibility χm per unit of volume of less than 5×10$^{-5}$.

9. The item according to claim 1, which is an external timepiece component selected from the group consisting of a middle, a back, a bezel, a push-piece, a bracelet link, a dial, a hand, and a dial index.

10. The item according to claim 1, which is a timepiece component of the movement selected from the group consisting of a toothed wheel, an arbor, a pinion, a spring, a bridge, a plate, a screw, and a balance.

11. The item according to claim 1, which is a balance arbor.

12. A method for manufacturing an item the item of claim 1, the method comprising, in order:
   a) producing a mixture with a ceramic powder mostly comprising tungsten carbide and a powder of a metal binder, the metal binder consisting, apart from the impurities, of silver, of palladium, of ruthenium, and of cobalt;
   b) forming an ébauche by giving to said mixture the shape of the item; and
   c) sintering the ébauche at a temperature between 950 and 1,600° C., for a time between 15 minutes and 8 hours, wherein the ceramic powder is present in a percentage by weight between 85 and 94%, and wherein the powder of the metal binder is present in a percentage by weight between 6 and 15%, each relative to a total weight of the ébauche.

13. The method of claim 12, wherein step b) is performed by pressing, by injection, by extrusion, or by an additive manufacturing method.

14. The item according to claim 1, which is shaped by additive manufacturing.

* * * * *